(No Model.) 6 Sheets—Sheet 6.

J. TRUEB.
THERMOTIC REGULATOR FOR HEATING APPARATUS.

No. 416,656. Patented Dec. 3, 1889.

Witnesses:
A. Schehl.
Henry Huber.

INVENTOR
Jacob Trueb
BY
Goepel & Raegener
ATTORNEYS.

UNITED STATES PATENT OFFICE.

JACOB TRUEB, OF NEW YORK, N. Y.

THERMOTIC REGULATOR FOR HEATING APPARATUS.

SPECIFICATION forming part of Letters Patent No. 416,656, dated December 3, 1889.

Application filed February 15, 1889. Serial No. 300,013. (No model.)

*To all whom it may concern:*

Be it known that I, JACOB TRUEB, of the city, county, and State of New York, a citizen of the United States, have invented certain new and useful Improvements in Thermometric Regulators for Heating Apparatus, of which the following is a specification.

This invention relates to certain improvements on the thermometric regulator for steam, air, and hot-water heating systems for which Letters Patent were granted to me heretofore, No. 354,522, dated December 14, 1886, the improvements being designed with a view to render the regulating device more sensitive and effective and to permit the relative adjustment of the motion-transmitting and heat-controlling mechanisms, so that the regulator can be set to any desired temperature and the supply of heat controlled in connection therewith.

The invention consists of a thermometric regulator for heating apparatus in which a closed flexible vessel contains the expansible liquid that is subjected in a separate non-expansible vessel to the action of the air in the building to be heated, said flexible vessel being made of semicircular form and flat cross-section convex at the middle part and concave at the ends, one end of said vessel being attached to a fixed support, while its opposite movable end serves to actuate by means of intermediate motion-transmitting mechanism the supply-valve of the heating medium.

The invention consists, further, of means for adjusting the motion-transmitting mechanism in such a manner that the heat can be regulated within fixed limits; and the invention consists, lastly, of certain details of construction by which the object of my invention is more effectively carried out, and which will be fully described hereinafter, and finally pointed out in the claims.

In the accompanying drawings, Fig. 3 is a side elevation of the thermometric regulator, drawn on a larger scale. Fig. $3^a$ is a vertical longitudinal section of the same on line $x$ $x$, Figs. 4 and 5.

Similar letters of reference indicate corresponding parts.

My improved thermometric regulator for heating systems consists of three main parts: of a closed non-expansible heat-transmitting vessel filled with an expansible liquid and located at any suitable point in or outside of the space the temperature of which is to be regulated, of a regulator proper which may be located either in the same space as and near the heat-transmitting vessel or at any other suitable point near the boiler, and of a heat-supply valve that responds by intermediate motion-transmitting mechanisms quickly and reliably to the varying movements of the regulator.

A in the drawings represents the closed non-expansible heat-transmitting vessel, B the regulator, and C the heat-supplying-valve mechanism. The heat-transmitting vessel A may be made of any approved construction, the one shown in the drawings consisting of a cylindrical shell A' and of a number of upright tubes $a$, that are screwed at their ends into supporting-plates $a'$ and connected by bent pipes $a^2$, so that the different tubes $a$ $a$ form one closely-connected vessel. They are filled with a suitable expansible liquid—such as mercury, glycerine, alcohol, turpentine, &c.—and connected by a tube $a^3$ with an expansion-vessel B' of the regulator B. The connecting-tube $a^3$ is provided at a point immediately below the tubes $a$ in the closed vessel A and at a point near the expansion-vessel in the regulator B with tightly-fitting stop-cocks $a^4$ and $a^5$, of any approved construction, so that the tubes $a$ and the expansion-vessel B' may each be separately closed. By opening both stop-cocks $a^4$ and $a^5$ the tubes $a$, connecting-tube $a^3$, and expansion-vessel B' form one connected receptacle for the expansible liquid.

For the purpose of transmitting the temperature of the air in the space to be heated the shell A' of the heat-transmitting vessel A is provided with a double-walled jacket and with air inlet and outlet pipes $a^6$ $a^7$, by which the air is conducted to the interior of the shell and around the tubes $a$ $a$ in the same, so that the temperature of said air may be transmitted to the expansible liquid in the tubes, and by the expansion and contraction of the liquid in the same the expansion-vessel B' in the regulator actuated. The double-walled jacket of the shell A' may be filled up with suitable non-conducting material, so as not to affect the air in the casing A' by the temperature of the surrounding atmosphere. By means of the jacketed shell A' the heat-transmitting vessel A can be located at any suitable part of a building, in which case it is connected with the space the temperature of which is to be regulated by suitable pipes, or the heat-transmitting vessel A may be located directly in the space the temperature of which is to be regulated, in which case the shell may be dispensed with and the tubes $a$ $a$ subjected to the direct action of the air in said space.

Figure 3A:
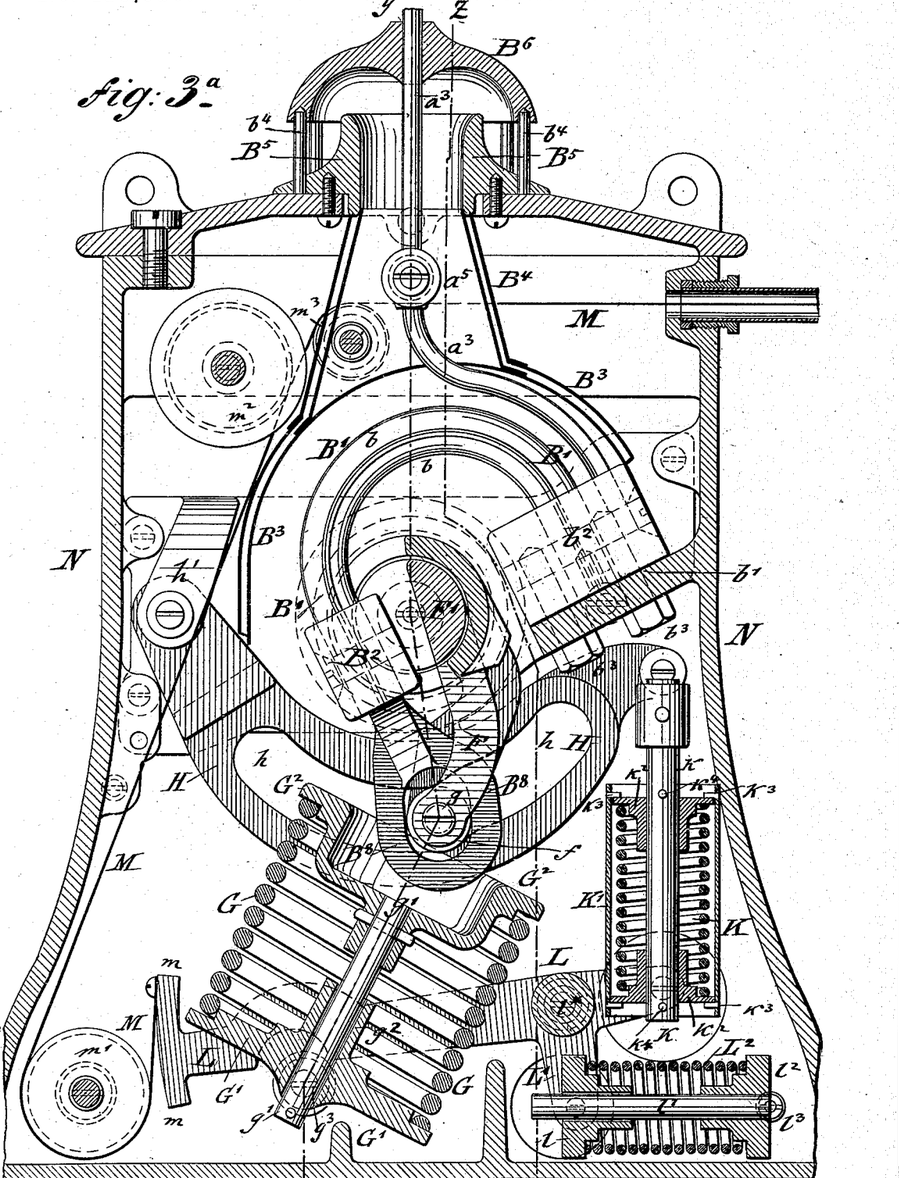

The expansion-vessel B' of the regulator B is made for the purpose of being more sensitive and of taking up less space in curved or semicircular shape and of flattened biconvex cross-section. The sheet-metal semi-sections $b$ $b$, which compose the expansion-vessel, are soldered or otherwise connected at the concaved overlapping edges, as shown clearly in Fig. 5. One end of the semicircular expansion-vessel B' is soldered to a block $b^2$, which is supported on an inclined bracket $b'$ of the casing N of the regulator, said block being attached by means of screw $b^3$ to the bracket $b'$, as shown clearly in Fig. $3^a$. The tube $a^3$ is secured to the block $b^2$ and connected by a channel in the same with the expansion-vessel B', so as to supply the expansible liquid from the tubes $a$ $a$ of the vessel A to the interior of the expansion-vessel B'. The opposite end of the expansion-vessel B' is closed by a tightly-fitting end piece $B^2$, which is attached thereto by solder and by fastening-screws, so that the liquid in the tubes $a$ $a$ and the expansion-vessel exerts by its expansion and contraction a tendency on the same to expand or straighten itself in the direction of its axis or contract and reassume its normally-curved shape.

For the purpose of subjecting the expansion-vessel B', like the tubes, to the influence of the air passing through the shell of the vessel A the outlet-pipe $a^7$ of the same is connected with the space surrounding the expansion-vessel B'. For this purpose the latter is inclosed by a jacketed casing $B^3$, which is connected by a tapering top part $B^4$ with a funnel-shaped inlet-mouth $B^5$ at the top of the casing N, said funnel being covered by a cap $B^6$ of larger diameter, which is supported on the top of the casing N by rods $b^4$, as shown clearly in Figs. 3, $3^a$, 4, and 5. The pipe $a^7$, which connects the shell A' with the space inclosed by the casing $B^3$, funnel $B^5$, and part $B^4$ supplies the air to the interior of the casing $B^3$ and fills up the space in the same, so as to transmit thereby its heat to the liquid in the expansion-vessel B'. The joint action of the expansible liquid in the tubes $a$ $a$ of the vessel A and expansion-vessel B' is exerted on the shell of the latter, which responds quickly to the rising and falling of the temperature of the air in such a manner that the outer end of the same is expanded in the direction of its axis or contracted again. This motion results from the expansive or contractile force of the expansible liquid in the vessels A and B, which is made use of for operating the heat-supplying-valve mechanism C in connection with a suitable intermediate motion-transmitting mechanism between the movable end of the expansion-vessel and the supply-valve.

The heat-carrying air is conducted from the casing $B^3$ through a downwardly-extending pipe $B^7$ to the outside of the regulator B. In case the regulating apparatus B is to be worked without the co-operative action of the tubes in the vessel A, the expansion-vessel B' at the interior of the regulator B is acted upon by the air that passes through the funnel $B^5$, top part $B^4$, casing $B^3$, and exit-pipe $B^7$, or vice versa, according as the temperature of the air surrounding the regulator is warmer or colder than the liquid in the expansion-vessel B'. The motion of the outer end of the vessel B' is transmitted by a slotted extension $B^8$ of the end piece $B^2$ to an anti-friction roller $f$ at the lower forked end of a lever F, which extends downward from a cylindrical shaft F', that is supported in conical bearings $f'$ of the rear plate of the casing N and of a front bridge N, said shaft being recessed for a distance equal to the width of the expansion-vessel B', so as to furnish the necessary space for the motion of the end piece $B^2$, as shown clearly in Fig. $3^a$.

Figure 4:
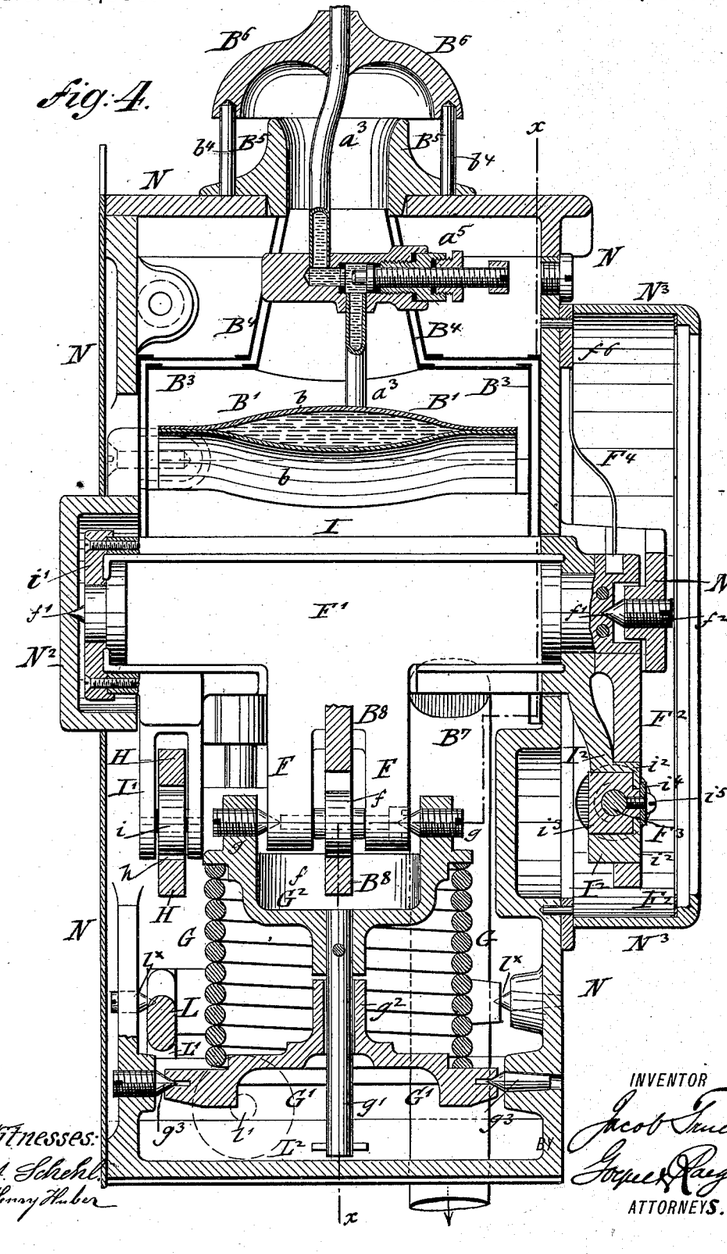
Figs. 4 and 5 are vertical transverse sections of the regulator, respectively on lines $y$ $y$ and $z$ $z$, Fig. $3^a$.
Figure 5:
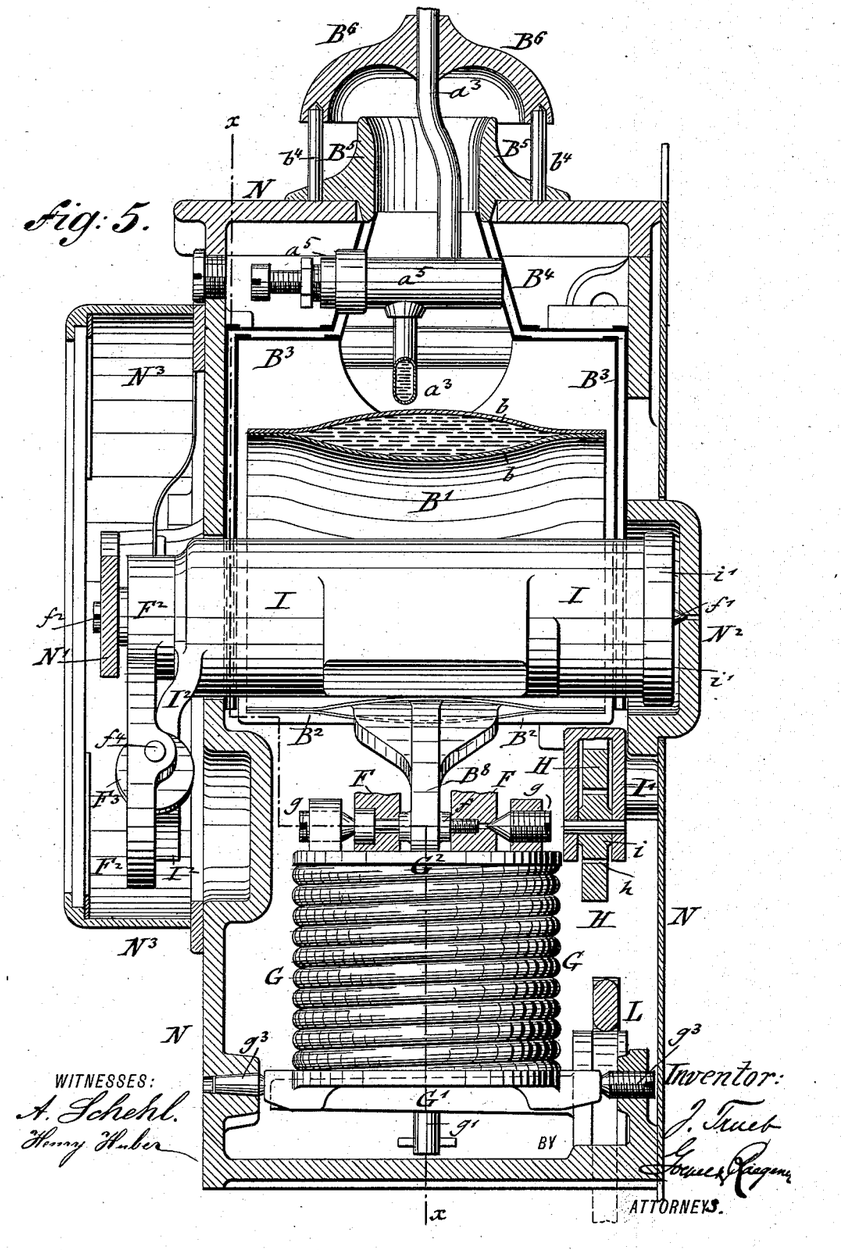

The anti-friction roller $f$ engages the slotted extension $B^8$ on the end piece $B^2$, and is coupled by the same with the lever F. The forked end of the lever F is further connected, in order to increase the motion of the expansion-vessel B' and apply the same in a more effective manner to the transmission of motion, with the conical steel pivots $g$ of a cup-shaped cap $G^2$, which is acted upon by a strong spiral spring G, that is interposed between a bottom disk G' and the cap $G^2$, the latter being provided with a fixed spindle $g'$, that is guided in a sleeve $g^2$ of the bottom disk G' in following the contraction or expansion of the spiral spring G. The bottom disk G' is pivoted at diametrically-opposite points to conical steel pivots $g^3$, secured to the casing N, as shown in Figs. 4 and 5, so that the spiral spring G and its supporting bottom disk G' and cap G² can turn on said pivots in following the motion of the roller $f$ and lever F. In this manner the lever F and the auxiliary spring G are coupled together and tend to exert a largely-increased power for transmitting the motion of the expansion-vessel B' to the heat-supplying-valve mechanism.

Figure 1:
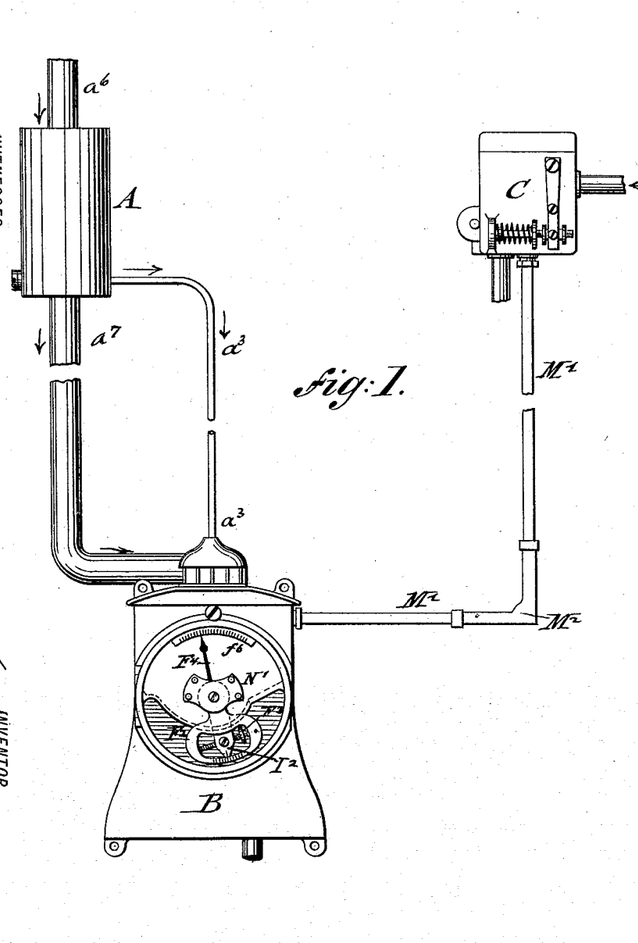
Figure 1 represents a side elevation of my improved thermometric regulator for heating systems, showing it connected with the heat-supply-valve mechanism and with the non-expansible heat-transmitting vessel by which the temperature of the space to be heated is transmitted to the regulator and the flexible vessel in the same.
Figure 2:
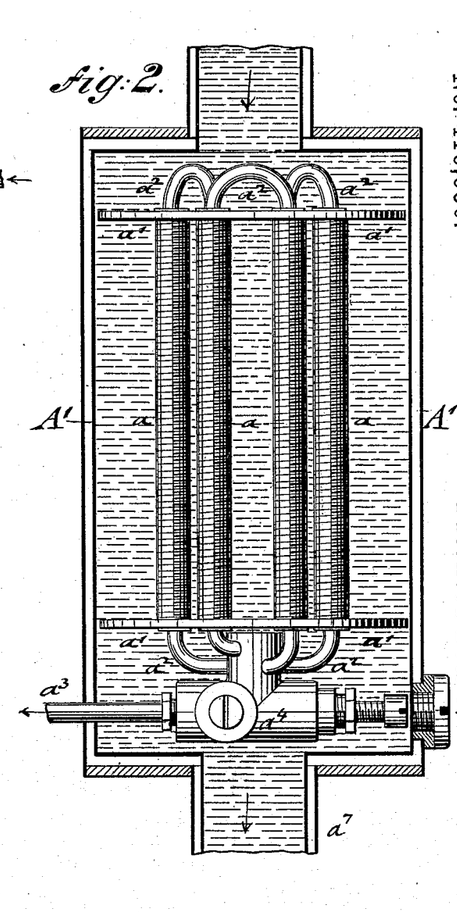
Fig. 2 is a vertical central section of the heat-transmitting vessel, drawn on a larger scale.

The shaft F' of the lever F is surrounded by a tubular shaft I, which is also recessed at the side next adjoining the end piece B² of the expansion-vessel B', as shown in Fig. 3ª, so as to provide for the free motion of the latter. The shaft I has at its rear end a forked arm I', which carries an anti-friction roller $i$, that engages the arc-shaped slot $h$ of a segmental lever H, which is pivoted at one end to a supporting-lug $h'$ of the casing N and at the opposite end with the upper end spindle K of a second compensating spring K, as shown clearly in Fig. 3ª. The arc-shaped slot $h$ of the segmental lever H is formed of two arc-shaped portions which are concentric to the axis of the shafts F' and I, the arc-shaped portion next to the spindle K having a somewhat smaller radius than the arc-shaped portion next to the lug $h'$, both arc-shaped concentric portions of the slot $h$ being connected by a short curve at their adjoining ends, as shown in Fig. 3ª. The rear end of the shaft I is supported on the cylindrical end of the shaft F' and provided with a cap-piece $i'$, having an opening for the passage of the pivot end of the shaft F', as shown in Figs. 4 and 5. The front ends of the shafts F' and I are extended through an opening of the casing N to the outside of the same, the shaft F' being supported by a conical bearing $f'$ on a steel pivot $f^2$ of the bridge N', which is attached by fastening-screws to the front wall of the casing N, as shown clearly in Figs. 1, 3, and 4. The front end of the shaft F' carries an arm F², which is enlarged at the lower end and provided with an arc-shaped opening of sufficient size to support therein a coupling-screw F³, one end of which bears on the inner edge of the opening of the arm F², while its opposite tapering end turns in a socket-shaped bearing of a stud $f^4$, that is pivoted to a recess at the opposite side of the enlarged arm F², as shown in Figs. 1 and 3. The milled head of the coupling-screw F³ is arranged near the stud $f^4$, so that the screw can be readily turned on its axis. The screw F³ forms the connection of the arm F² with an arm I², that is attached to the front end of the tubular shaft I back of the arm F² of the shaft F', said arm I² being provided with a boss $i^2$, that is provided with an opening into which a cylindrical swivel-piece $i^3$ is retained by means of a washer and set-screw $i^5$. The cylindrical swivel-piece $i^3$ is provided with a diametrical aperture that is threaded, so as to be engaged by the adjusting-screw F³, which passes through the same, as shown in Figs. 3 and 4. The boss $i^2$ is provided in line with the aperture of the piece $i^3$ with side openings, so as to provide for the play of the adjusting-screw F³. The screw F³ couples the arms F² and I² of the shafts F' and I adjustably with each other, so that the position of the levers F and I' can be changed relatively to each other, which adjustment is utilized for setting the regulator so that it responds to the different degrees of temperature which are desired to be kept up in the space to be heated. For this purpose the enlarged arm F² is provided at its lower part with a graduated scale $f^5$, along which the tapering end of the arm I² is moved, said lever being provided with an index-mark that is adjusted along the scale $f^5$ to the required degree of temperature. To the front end of the shaft F' is further attached a pointer F⁴, which moves along a fixed thermometric scale $f^6$ at the upper part of the front plate of the casing N, as shown in Fig. 1, said pointer F⁴ being so adjusted as to indicate with the temperature of the space which is to be heated to the required temperature. The arm F², arm I², pointer F⁴, and the coupling-screw F⁸, that connects the arms F² and I², are inclosed in a hinged cylindrical casing N³ at the front part of the main casing N, said casing being provided with a glass front, through which the parts referred to can be seen and readily adjusted by opening the glass casing N³. It is obvious that the pointer F⁴, which follows the motion of the shaft F' as transmitted thereto by the expansion-vessel B', end piece B², and lever F indicates the temperature of the air that actuates the expansion-vessel B', and thereby the exact temperature of the room to be heated. The lower scale, however, permits the adjustment of the regulating apparatus to that degree of temperature which is desired to be given to the space to be heated, as by the coupling-screw F³ the relative position of the levers F and I', and thereby the opening and closing of the heat-supplying-valve mechanism, is controlled.

The operation of the supply-valve is accomplished by the movement of the arm I' and its anti-friction roller $i$ along the arc-shaped slot $h$ of the lever H. When the temperature rises above that required, the anti-friction roller passes by the motion of the end piece of the expansion-vessel B' into that portion of the slot $h$ which has the greater radius, so as to produce by the intermediate motion-transmitting mechanism the closing of the heat-supplying valve. When the temperature of the room to be heated falls below that required, the expansion-vessel B' is contracted, and thereby the anti-friction roller I² moved along the short connecting curve of the concentric portions of the slot $h$ into that portion having the smaller radius, by which motion the supply-valve is opened and kept open as long as the anti-friction roller $i$ remains in that portion of the slot $h$, during which motion no action is exerted on the heat-supply valve, but the same kept in open position until by the rise of the temperature the roller $i$ is moved back again over the short curve at the middle part of the slot to the opposite end portion of the slot, so as to close the valve and keep the same closed until the temperature falls again, and so on. The oscillations of the lever-arm I' in the slot $h$ of the lever H in following the motion of the end piece of the expansion-vessel B' produces thus the alternating opening and closing of the heat-supplying-valve mechanism, so as to keep up the required uniform temperature in the room to be heated. This is accomplished in a reliable and accurate manner by the sensitiveness of the expansion-vessel, the assistance being given to the same by the auxiliary spiral spring G and by the intermediate motion-transmitting mechanism, by which latter the heat-supplying valve is actuated.

Figure 6:
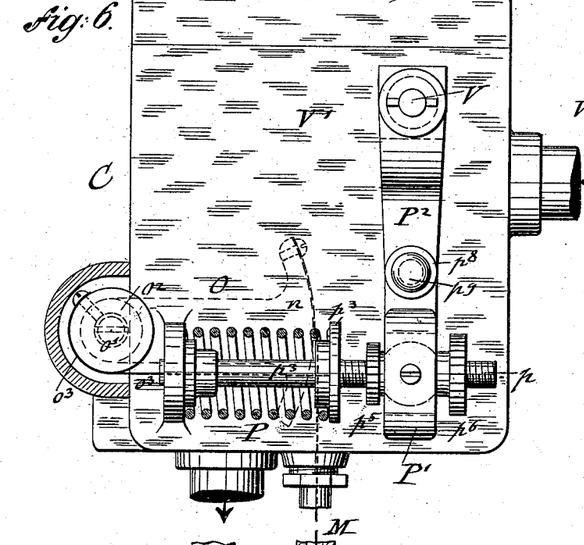
Figs. 6, 7, and 8 are details of the heat-supplying-valve mechanism operated by the regulator.
Figure 7:
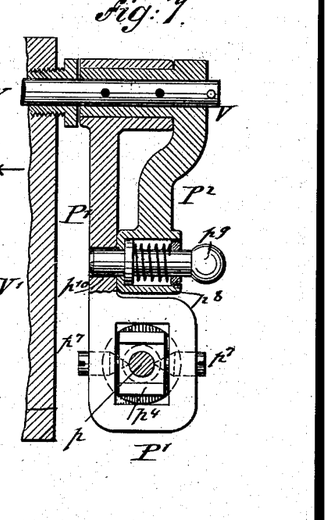
Figures 8, 9, 10, 11:
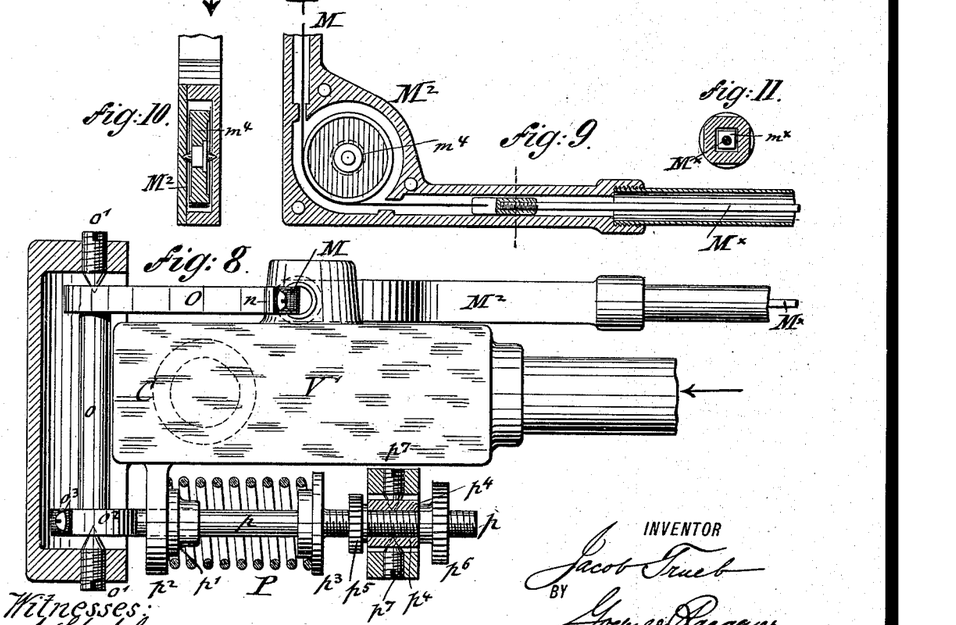
Figs. 9, 10, and 11 are details of the motion-transmitting mechanisms between the regulator and the heat-supplying-valve mechanism.

The motion-transmitting mechanism consists of an intermediate cushioning-spring K, a fulcrumed and spring-cushioned transmitting-lever L, having a segmental end, and a metal band M of suitable length, that is guided over suitably-arranged pulleys in fixed conduit-tubes and finally connected to the supply-valve. The intermediate cushioning-spring K, its spindle $k$, and the cylindrical shell K' form the connecting-link between the levers H and L. The spring K is interposed between disks $k^2 k^2$, which rest on supporting-pins $k^3 k^4$ of the shell K' and spindle $k$, as shown in Fig. 3ª. The oscillating motion of the lever H is transmitted by the spindle $k$, spring K, shell K', and disks $K^2$ to the fulcrumed lever L, which is fulcrumed to steel pins of the front and rear wall of the casing and pivoted by its shorter arm to the lower part of the shell K'. A downwardly-extending arm L' of the lever L is pivoted to a disk $l$, that is guided on a spindle $l'$, connected to a second disk $l^2$, that is pivoted at $l^3$ to the casing N. A spiral spring $L^2$ is interposed between the pivoted disk $l^2$ and the movable disk $l$, said spring serving to re-enforce the action of the spring K and to overcome the frictional resistance of the motion-transmitting metal band M, which is attached to a segment $m$ at the end of the longer arm of the fulcrumed lever L. The metal band M passes from the segment $m$ over guide rollers or pulleys $m'$, $m^2$, and $m^3$, located in the casing N of the regulator, as shown in Fig. 3ª, and through inclosing guide-tubes M', provided with angle-pieces M², having pulleys $m^4$, when the band M has to change its direction, as shown in Figs. 1 and 9. For longer distances in a straight direction the band M is replaced by a rod $M^\times$, which is connected to the band-sections by square coupling-pieces $m^\times$, that are guided in square end tubes of the angle-pieces M², as shown in Figs. 9 and 11. The rods $M^\times$ and coupling-pieces $m^\times$ prevent the turning and twisting of the transmitting-band M. The length of the band M corresponds to the distance of the regulator from the supply-valve, the last section of the band M being attached to a segment $n$ of a lever-arm O, that is rigidly attached to a spindle $o$ of the valve-casing V'. The spindle O is supported by steel pivots $o'$ and provided at the opposite end with a fixed disk $o^2$, to the circumference of which is attached a metal band $o^3$, the opposite end of which is attached to the spindle $p$ of a spiral tension-spring P, which is interposed between a disk $p'$, supported on a projecting lug $p^2$ of the valve-casing V' and a disk $p^3$, that is attached to the spindle $p$. The opposite end of the spindle $p$ slides freely in the hub of the disk $p'$, so as to respond to the motion transmitted by the metal band M and to the tension exerted by the spring P in opposite direction thereto. The spindle $p$ is extended beyond the disk $p^3$ and connected to a swivel-piece $p^4$ by means of two jam-nuts $p^5$ $p^6$, which are applied to the threaded elongation of the spindle $p$, as shown in Figs. 6 and 8. The swivel-piece $p^4$ is supported by steel pivots $p^7$ in a corresponding opening at the lower end of a lever-arm P', the upper sleeve-shaped end of which is loosely applied to the hub of a coupling-arm P², that is keyed to the spindle V of the supply-valve, which is located in the casing V' and made of any approved construction. The coupling-arm P² is provided with a socket $p^8$ and spring-bolt $p^9$, guided in said socket, said spring-bolt engaging a knob $p^{10}$ of the lever-arm P' and producing thereby either the coupling of the lever-arm P' and arm P², and thereby the connection of the spindle V of the supply-valve with the motion-transmitting band, or the uncoupling of the arms P' and P², and thereby the disconnection of the supply-valve from the regulator and the intermediate motion-transmitting mechanism. By a proper adjustment of the cushioning-spring K, re-enforcing-spring L², and tension-spring P the supply-valve responds in a quick and reliable manner to the action of the regulator, so as to open more or less when the temperature falls, or close entirely when the temperature in the rooms to be heated rises above the required point. The supply-valve is thereby operated in perfectly automatic manner and supplies the required quantity of steam, hot water, or other heating medium to the radiators or other heat-distributing accessories.

Having thus described my invention, I claim as new and desire to secure by Letters Patent—

1. The combination, with a heat-transmitting vessel containing an expansible liquid, a regulator provided with an interior expansion-vessel, a pipe connecting the heat-transmitting vessel with said expansion-vessel, a heat-supplying valve and a motion-transmitting mechanism between the expansion-vessel and the supply-valve, whereby the latter is opened or closed, according to the temperature to be produced in the rooms to be heated, substantially as set forth.

2. The combination of a heat-transmitting vessel composed of interior tubes containing an expansible liquid and an exterior casing connected with the space the temperature of which is to be regulated, a regulator provided with an interior expansion-vessel, pipes connecting, respectively, the interior tubes and casing of the heat-transmitting vessel with the expansion-vessel and casing of the regulator, a heat-supplying valve, and a motion-transmitting mechanism between the regulator and supply-valve, by which the supply-valve is operated so as to keep the required temperature in the rooms to be heated, substantially as set forth.

3. The combination of a heat-regulator provided with a closed semicircular expansion-vessel containing an expansible liquid, an end piece having a slotted extension, an oscillating lever connected with said end piece, a re-enforcing spring connected with said lever, intermediate spring-cushioned transmitting-levers operated by the primary lever, a supply-valve, and an intermediate motion-transmitting mechanism between the transmitting-levers and the supply-valve, substantially as set forth.

4. The combination, with a closed semicircular expansion-vessel secured rigidly at one end, a slotted end piece secured to the opposite movable end of the same, a forked oscillating lever having an anti-friction roller engaging said end piece, a re-enforcing spring connected with said lever, a second forked lever applied to a tubular shaft inclosing the shaft of the first lever, a segmental transmitting-lever having arc-shaped slot with an intermediate cam portion for engaging a friction-roller of the second lever, arms attached to the outer ends of the shafts of the first and second levers, and an adjusting-screw connecting the ends of said exterior arms, so as to adjust the relative position of said levers toward each other, substantially as set forth.

5. The combination of a closed semicircular expansion-vessel secured to a fixed block at one end, an end piece attached to the opposite end of the expansion-vessel, a forked oscillating lever having an anti-friction roller engaging said slotted end piece, a re-enforcing spring connected with said lever, a second forked lever applied to a tubular shaft surrounding the shaft of the first lever, a segmental spring-cushioned lever having an arc-shaped cam-slot engaging an anti-friction roller of the second lever, a fulcrumed and spring-cushioned motion-transmitting lever connected with the slotted segmental lever, and a metal band or tape applied to the fulcrumed transmitting-lever, means for guiding said band or tape, and a spring-cushioned lever on the spindle of the supply-valve, connected with said band, substantially as set forth.

In testimony that I claim the foregoing as my invention I have signed my name in presence of two subscribing witnesses.

JACOB TRUEB.

Witnesses:
PAUL GOEPEL,
CARL KARP.